United States Patent [19]
Miskolczy et al.

[11] 3,813,210
[45] May 28, 1974

[54] CEMENT KILN AND METHOD

[75] Inventors: Gabor Miskolczy, Carlisle; Paul K. Shefsiek, Acton; Pierre J. Brosens, Belmont, all of Mass.

[73] Assignee: Thermo Electron Corporation, Waltham, Mass.

[22] Filed: July 26, 1972

[21] Appl. No.: 275,339

[52] U.S. Cl. .................. 432/15, 432/58, 432/105, 432/109
[51] Int. Cl. .................................. F27b 15/00
[58] Field of Search ......... 432/14, 15, 58, 105, 106, 432/109

[56] References Cited
UNITED STATES PATENTS

| | | | |
|---|---|---|---|
| 1,468,168 | 9/1923 | Pike | 432/106 |
| 2,020,960 | 11/1935 | Pehrson et al. | 432/105 X |
| 2,520,637 | 8/1950 | Henwood | 432/58 |
| 2,529,366 | 11/1950 | Bauer | 432/15 |
| 2,761,668 | 9/1956 | Sylvest | 432/15 |
| 3,182,980 | 5/1965 | Helfrich | 432/109 |

*Primary Examiner*—John J. Camby
*Attorney, Agent, or Firm*—James L. Neal

[57] ABSTRACT

A cement kiln incorporates a perforated floor for supporting an overburden of finely divided particulate material and preventing passage of the overburden through the perforations. Submerged beneath the particulate material, beneath the perforated floor, is a burner for directing products of combustion as jets through the mix. The cement kiln may be in the form of a rotary drum or an inclined stationary trough. In the inclined stationary trough, the jets of combustion products at least partially fluidize the overburden and cause it to flow down the incline.

15 Claims, 7 Drawing Figures

CEMENT KILN AND METHOD

BACKGROUND OF THE INVENTION

In a cement kiln, ground rock, usually fed in the form of a slurry, is converted to cement clinker. The chemical reactions involved and the microstructure of the product are complex, but they can be described generally as follows:

In the initial portion of the kiln, the water in the slurry is evaporated. In some installations, this is accomplished prior to feeding into the kiln. The drying operation is followed by decomposition and dehydration of the clays at 1,100° to 1,450°F; the limestone begins to calcine, i.e., to decompose into CaO and $CO_2$. The temperature of the mix is further increased, and at about 1,650°F the calcination is completed.

The slurry has now been transformed into a hot mixture of quicklime and clay particles, and a chemical reaction starts to occur between finely divided particles. As the temperature rises further (up to 3,000°F or higher), fusible products form at the point of contact of the grains of lime and the particles of clay, and these products diffuse into the line and the clay. Above 2,350°F, CaO and $SiO_2$ react exothermically to produce dicalcium and tricalcium silicate ($2CaO \cdot SiO_2$ and $3CaQ \cdot SiO_2$). The reaction occurs by diffusion through the molten aluminates and ferrites, which now constitute 20 to 30 percent of the mass, and the silicates formed crystallize out. The density of crystal nucleation sites depends on the maximum temperature reached, and the crystal sizes obtained depend on the time and temperature and on the cooling rate. In the final product, these crystals are covered by a layer of glass from the solidified liquids and are called clinker. For optimum properties, it is important to obtain specific crystal sizes. This need defines the cooling conditions, and it may limit the ability to recover heat from the hot clinker. For instance, in many kilns, the clinker is cooled with a water spray, not only to attain the proper crystal size, but also to embrittle the glass phase and to improve the ease of grinding the clinker.

Typically, a prior art cement kiln is a rotary device on the order of 12 feet in diameter and as much as 500 feet in length. The input end is generally at a higher level than the discharge end and the kiln is slowly rotated to tumble the mix gradually toward the discharge end. Cement mix is of ground material of the calcareous type such as limestone, cement rock, chalk, marc, marine shells and of argilaceous materials such as clay, shale, bauxite, slate, blast furnace slag or ashes.

The wall of the kiln is lined with an insulating refractory material, as required to provide a structurally safe temperature on the kiln's metal skin, and a burner, generally of enormous size, is arranged to fire upstream inside the kiln and located at the discharge end of it. In this fashion, all of the hear required for the drying of the kiln feed and the necessary chemical reactions is provided.

The conventional arrangement of the large single burner disposed at the discharge end of the kiln is convenient insofar as providing fuel and air is concerned. It is neither convenient nor efficient in regard to the requirements of processing the kiln feed constituent. Furthermore, the use of a single large burner makes it very difficult to control the local amounts of heat supplied and to adjust them to the requirements of the reactions.

It is evident that, by supplying the heat to the mix at locations where it can be used immediately in heating the mix, the mix must be supported in a mode that enhances heat transfer and also makes efficient use of the kiln volume.

It is an object of this invention to increase the efficiency of cement kilns by improved heat transfer between combustion products and cement mix.

It is also an object of this invention to heat to a mix particulate material from numerous zones rather than from a single source.

It is a further object of this invention to provide a cement kiln of simplified construction.

SUMMARY OF THE INVENTION

In general, the present invention is based upon the recognition that heat and temperature requirements of kiln-heating, especially in cement manufacture, vary along the extent of a kiln and that heat transfer will be enhanced by directing small jets of combustion products through the finely divided material forming a cement mix. According to the present invention, heat is deliverable zonally in controlled quantity and may be delivered at various temperature levels. The necessary heat is released to the particulate material, particularly in the calcination zone, by providing a number of burners submerged beneath the particulate material which fire through a perforated plate into and through the material. Jets of combustion products at least partially fluidize the material while simultaneously heating it. This provides highly efficient heat transfer to the mix. By appropriate spacing and sizing of the burners and control of fuel-mix supply, a temperature profile is attainable which closely matches the requirements of the particular kiln. That is, the heat output at any locus along the kiln length is a function of the firing rate of a particular one or particular group of the various burners submerged beneath the floor.

The kiln floor may consist of a series of perforated plates covering modular burners; products of combustion produced in the burners may be forced as jets through the plates and into the system.

In a preferred embodiment, perforated plates are set into a floor for supporting an overburden of particulate material in an inclined trough-like kiln. The plates may be flush with the floor or set slightly above or below the remainder of the floor surface. Burners are arranged so that the combined action of the fluidization of the material and the force of gravity will transport the mix at a controlled speed from the one end of the trough kiln to the other. In the process, the mix will be agitated, preheated, calcined and finally discharged into a rotary kiln where clinkering will take place. The clinker is then transferred to a clinker cooler where it is quenched as required. In a plate or section of floor which is perforated, the total open area formed by the perforations is a small percent, for example 10 percent, of the total floor area in that section. This provides a uniform pressure plenum beneath the perforated floor so that jets of combustion products formed by the perforations will be of substantially equal size and so that the overburden may be given a predicatable amount of fluidity. The depth of the perforations is substantially greater than their width so that the finely divided par-

DETAILED DESCRIPTION OF THE DRAWINGS

Figure 1:
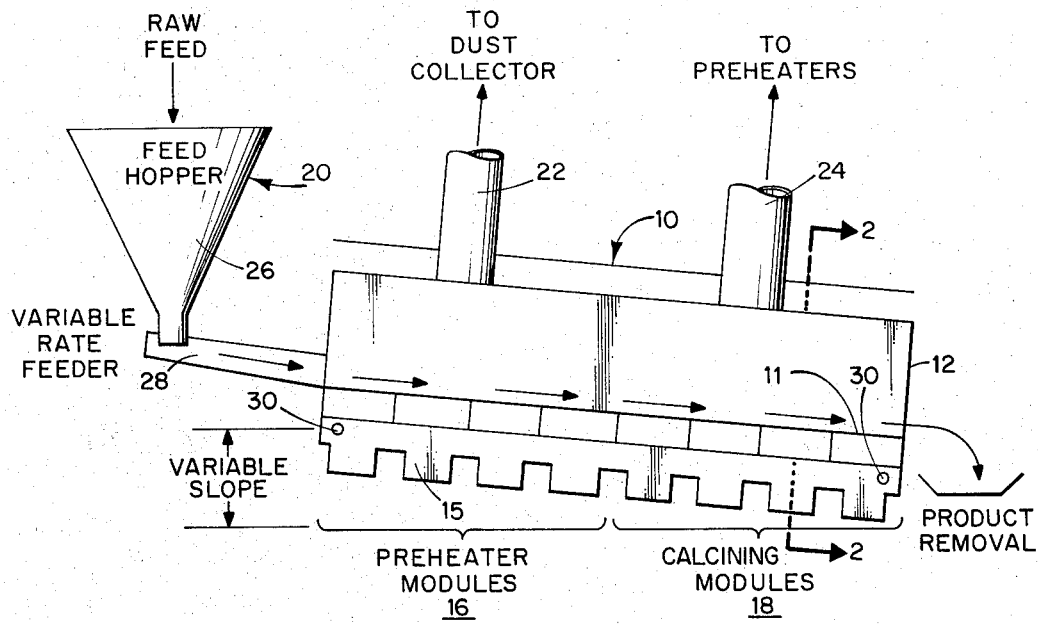
FIG. 1 illustrates a kiln embodying the invention.

Referring to FIG. 1, there is shown a kiln 10 which includes an inclined trough 12, a perforated trough floor 11, preheater modules 16, calcining modules 18, and feed means 20. A conduit 22 leads from the section of the trough 12 over the preheater modules 16 to a dust collector and a conduit 24 leads from the section of the trough 12 over the calcining modules 18 to the preheated modules 16. The feed means includes a hopper 26 and a variable rate conveyer 28 for feeding the raw material into the trough 12. The trough 12 may be movably mounted on supports 30 so that its incline will be variable.

A feed of finely divided particulate material enters the trough 12 through the feed hopper 26 and the conveyor 28 and first travels over the preheated modules 16. The preheated modules 16 are installed beneath a section of perforated floor 11 and form plenum chambers 15 from which hot gases are forced up through an overburden of the finely divided particulate material supported by the floor 11. The hot gases may comprise combustion products fed through the perforated floor 11 directly from the plenum chambers 15, or the hot gases may be waste gases from the area of the trough 12 above the calcining modules 18, or a mixture of the two.

The hot gases passing through the perforated floor 11 from the plenum chambers 15 fluidize the overburden of finely divided particulate material in a sufficient amount to cause it to tumble or flow down the incline of the trough 12 to the calcining modules 18.

Figure 4:
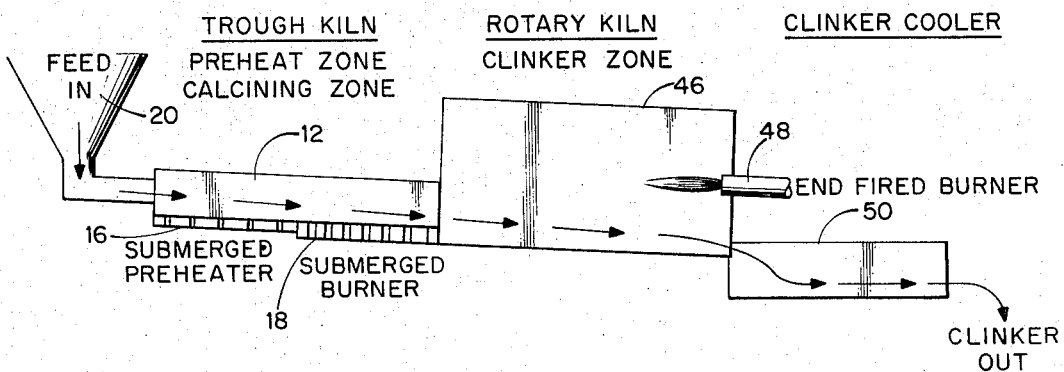
FIG. 4 is an alternate embodiment of the kiln of this invention.
Figure 2:
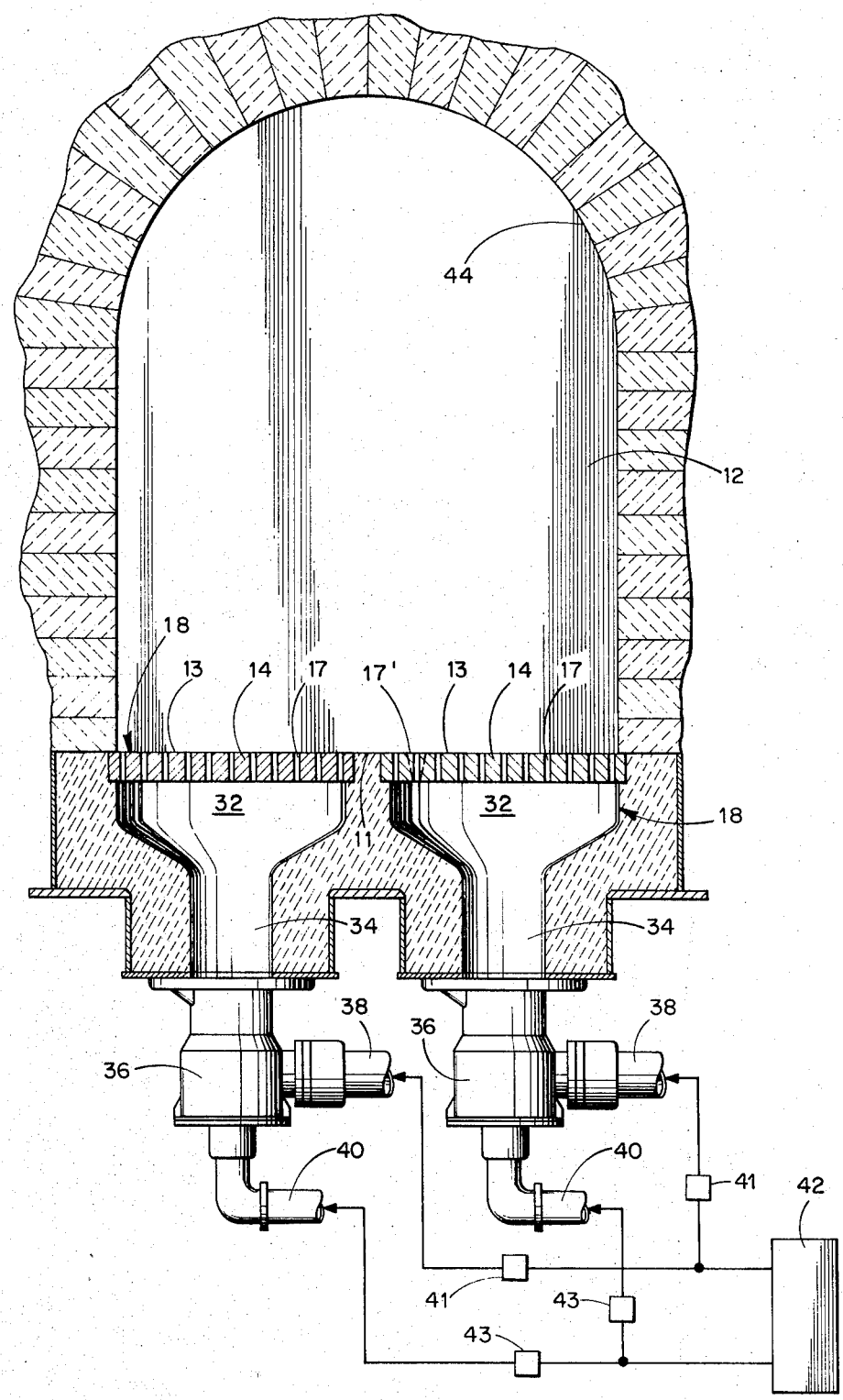
FIG. 2 is a detailed cross-sectional view of the apparatus of FIG. 1.

The action of the calcining modules 18 will be discussed in connection with FIGS. 1 and 2. (Construction of the preheater modules 16 in the apparatus of FIG. 1 corresponds to construction of the calcining modules 18.) Beneath the perforated floor 11, in the section of the trough 12 having the calcining modules 18, there is a combustion chamber 32 connected by a neck 34 to a burner head 36. The burner head receives reactant, such as natural gas and air, from inlet passages 38 and 40. A blower means 42 forces the reactants into the burner head 36, then to the combustion chamber 32 and ultimately as jets of combustion products through perforations 17 in the floor. Products of combustion issuing through the perforations 17 in the floor 11 calcine the finely divided cement mix and at least partially fluidize it so that it continues to flow down the incline of the trough. The extent to which the cement mix is fluidized may be controlled as a function of the output of the blower means 42. Valve means 41 and 43 permit individual control of each module 18. Heat addition in a fluidized mode results in a high heat transfer rate, an increased processing rate and fast response to changes in the condition of the load of overburden. In cement kiln operation, the finely divided material calcined in the trough 12 may flow to a short rotary kiln 46 where an end fired burner 48 will bring the mix to clinkering temperature. The clinker is then discharged to a clinker cooler 50, as in a conventional process (See FIG. 4).

The floor 11 may be composed of a high temperature refractory material 19 having a number of the perforated plates set therein. The perforated plates 14 may be located quite close to each other, the perforations 17 being in any suitable pattern. The plate 14 may be constructed of silicon carbide, aluminum oxide, zirconium oxide, some combination of the three, or any material which will withstand the temperature and pressure conditions to which it is subjected. The trough 12 may be enclosed by a suitable material such as refractory brick. A further desription of the apparatus shown in FIG. 2 is given below and in U.S. Pat. application Ser. No. 273,955, filed July 21, 1972, in the name of Andrew J. Syska and assigned to the assignee of the present invention. (The entire specification of application Ser. No. 273,955 (Docket No. 70-19) is herein incorporated by reference.) The width of the openings formed by perforations in the surface of the perforated plate 14 should be substantially greater, and may be several orders of magnitude greater, than the characteristic width of the particles forming the particulate material; for example, the particle width might be 0.010 inches while the diameter of a round perforation might be from 0.125 to 0.250 inches. The thickness of the perforated plate, and thereby the depth of the perforation, should be several multiples of the opening width formed by the perforation. The relatively high ratio of perforation length to perforation width inhibits the passage of particulate material through the perforation both during operating and non-operating conditions. During non-operating conditions, the particulate material which begins to pass through the perforations will encounter an amount of friction sufficient to cause the material to lodge in the perforations, form a solid mass, and prevent further entry of material into the perforations. During operating conditions, gases passing from the combustion chamber 32 (or any plenum 15) through the relatively long perforations fluidizes the finely divided material in the perforations and continuously blows it therefrom.

A relatively small percent of the surface area of the perforated plate should be occupied by the perforations. There does not appear to be a critical limit as to the ratio of the sum of the areas of the perforations to the total plate area, but the open area in the plate should be great enough that, for a given flow rate, the pressure drop across the plate is not as high as to create an unacceptable amount of dust. Further, an excessive pressure drop across the plate can result in excessively high velocity jets which blow not only dust, but all material away from the plate. On the other hand, the open area of the plate should be small enough that the plenum formed in the combustion chamber is of substantially uniform pressure. When the pressure in the plenum is uniform, the flow of products of combustion through the plate will be uniform over the plate area. If pressure in the plenum is not uniform, there will be non-uniform heat output over the plate area. A typical result of excessive perforation of the plate is greater flow of products of combustion through the center of the plate than around its periphery.

The burner heads 36 may be of any type which mixes fuel and air intimately to give essentially complete combustion below the perforated plate 14 and substantially no combustion above the perforated plate. The burner heads 36 and the blower means 42 are commercially available hardware. Suitable burners are obtainable from Eclipse Fuel Engineering Company of Rockford, Illinois; Pyronics, Inc. of Cleveland, Ohio; and North American Manufacturing Company, 4455 East 71st Street, Cleveland, Ohio. One suitable burner is the North American Manufacturing Comapny burner No. 4832-4, Flat Flame Burner. Suitable flame control apparatus is produced for enabling the firing rate of each burner to be individually set. For example, lines 38 and 40 may be provided with valves 41 and 43 respectively.

The perforated plate covering the combustion chamber 32 must be made of a material which can withstand the high temperatures generated by the flame plus that re-radiated by the hot material mix, for example, a ceramic plate. The material must also withstand the thermal shock of cold mix falling unto the hot plate plus the pressure of the overburden and the pressure drop across the plate.

In order to achieve a uniform heat release over the entire plate surface, the perforations preferably occupy not substantially less than one percent or substantially greater than ten percent of the total plate area. This range does not constitute an absolute limit and the manner in which the percentage of open plate area may be varied can best be understood by reference to the factors ultimately to be controlled. For a given flow rate, the pressure drop across the perforated plate 14 is a function of the percent of open plate area. This parameter is valued, as described below, to create a plenum in the combustion chamber 32 which is of substantially uniform pressure throughout. To achieve this result, the frictional loss, or pressure drop, across the combustion chamber 32 should be much less than the pressure drop across the perforated plate 14. For example, the pressure drop occurring across the perforated plate 14 may be ten times greater than the pressure drop occurring between the neck 34 and the lower surface of the perforated plate 14. If the open area of the plate becomes too great, this relative difference in the pressure drop cannot be maintained and the pressure in the combustion chamber 32, and thereby the heat output, will vary across the surface of the plate 14. Additionally, the pressure drop across the plate is calibrated to be substantially greater than the maximum anticipated pressure drop across the overburden of finely divided material so that the weight of the material will not block or substantially reduce the flow of combustion products through the perforations. On the other hand, if the percent open area in the surface of the perforated plate 14 is too low, there may be an excessive pressure drop across the plate for the given flow rate. Under optimum operating conditions, the jet issuing from each perforation 17 will be of the same height. For apparatus constructed along the lines of those shown in FIG. 2, the optimum percent of open plate area appears to lie in the range of one percent to three percent.

Figure 3:
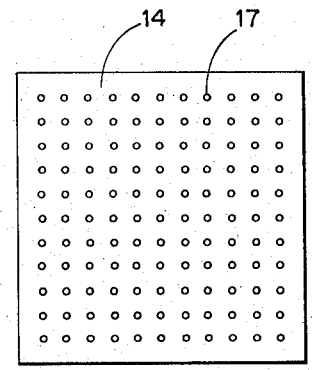
FIG. 3 is a plan view of an element shown in FIG. 2.

In reference to FIG. 3, there may be seen one simple and acceptable pattern of perforations for a plate 14. Any perforation pattern suitable for a given specific application may be used. Although the perforations in FIG. 3 are shown in uniform distribution, they need not be so distributed.

Jets issuing from perforations 17 should be well developed and stable. For this reason, the ratio of perforation length ($l$) to perforation diameter or width ($d$) is preferably not substantially less than five. For the apparatus shown in FIGS. 2 and 3, best results have been obtained with ($l/d$) ratios not substantially less than eight or substantially more than twelve. However, successful results were obtained with an ($l/d$) ratio of 16.

A further requirement is that the combustion is stopped. The perforation diameters may be one-eighth to one-forth inch while, in the case of a cement kiln, the average particle size of the finely divided material is usually less than 200 mesh (e.g., 0.0029 in.). An ($l/d$) ratio of five successfully inhibits objectionable passage of such particles into the combustion chamber 32. Particularly good results are obtained in the apparatus of the preferred embodiment with an ($l/d$) ratio of substantially eight or more.

The apparatus operates to provide substantially complete combustion in the combustion chamber 32 and to issue substantially uniform jets of combustion products from each of the perforations 17 whether or not an overburden of particulate material covers the plates 14. The system is thus insensitive to variations in overburden load during operation and to overburden load conditions at start-up and shut-down.

Figure 5:
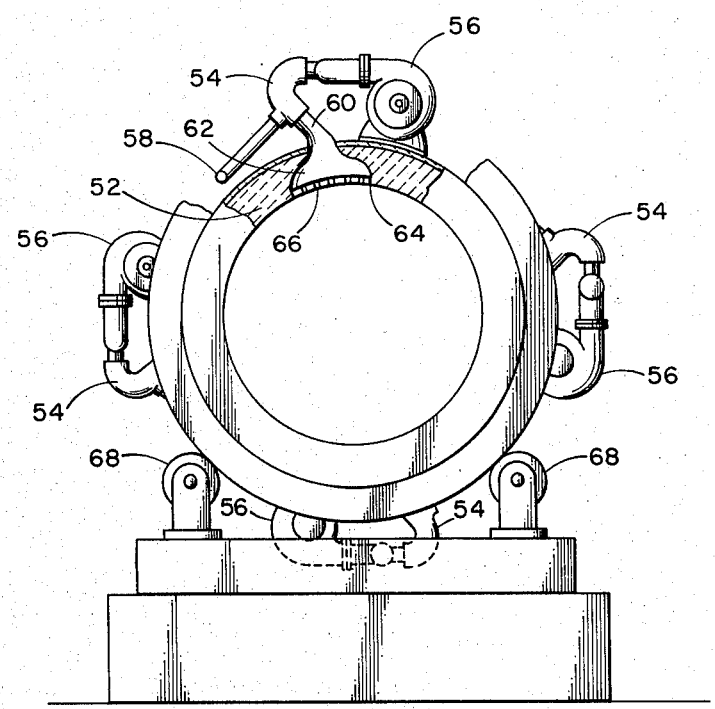
FIG. 5 is a schematic view of the kiln of FIG. 1 incorporated in a cement kiln system.

That the invention may be incorporated into a rotary kiln is illustrated in FIG. 5 wherein numeral 52 designates cylindrical kiln walls which support a plurality of burners 54, each associated with a combustion air blower 56 and gas inlet 58. Extending through the wall 52 of the burner 54 is a neck 60 and a combustion chamber 62 enclosed by a plate 64 having perforations 66. The perforated plate, combustion chamber and burner assembly cooperate to direct jets of products of combustion inwardly of the rotary kiln in a manner similar to that described above in connection with the trough kiln. As the kiln rotates upon its supports 68, the finely divided particulate material tumbles along the inner surface of the kiln wall 52. The perforated plates 64 which at any given time are at or near the bottom of the cylinder fire through the finely divided particulate material. The rotary kiln also may be inclined to cause the material to flow from end to end. In the rotary kiln, the rotary motion of the kiln as well as the fluidizing effect of the jets of combustion products cause a material flow.

Figure 6:
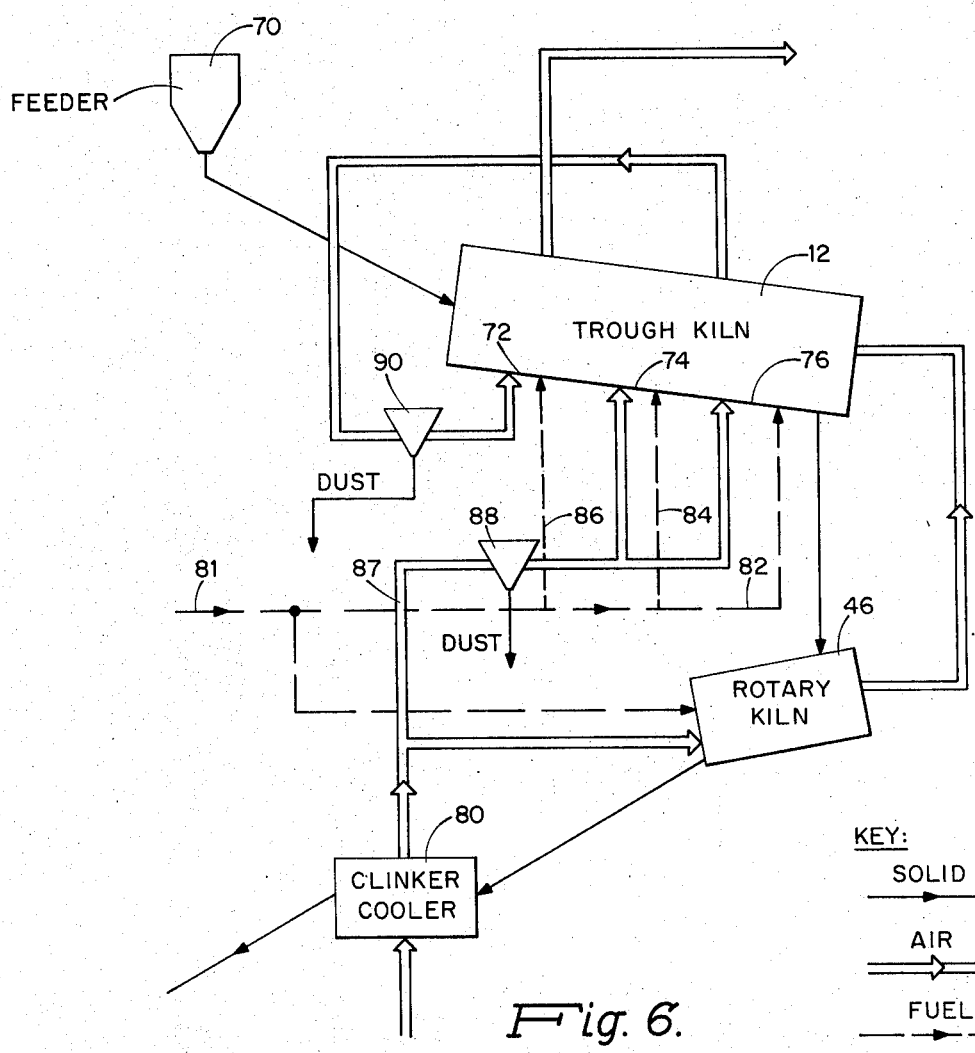
FIG. 6 is a schematic view of a cement kiln showing materials flow therethrough.

A complete cement kiln system including a description of the solids, air and fuel flow paths, will be described in connection with FIG. 6.

Dry raw mix enters a preheater zone 72 of the trough kiln 12 from the raw mix feeder 70. The preheater section 72 utilizes waste gases from the calcining zone 76 of the trough kiln. Mix heated in zone 72 flows to zone 74 where the mix temperature is raised further by hot air from the clinker cooler 80. The mix then enters a calcining zone 76 where submerged burners calcine it. Eighty percent (80 percent) of the total system fuel is burned in the calcining zone 76. Preheated combustion air from the clinker cooler 80 passes through line 87 to heating zone 74 and to augment burners in the calcining zone 76. Plates 14 function in the zones 72 and 74 in a manner substantially identical to that described in connection with FIGS. 2 and 3. Since hot air from the clinker cooler 80 contains a considerable amount of dust, it is directed through a separator 88 where a major portion of the dust is removed and returned to the supply. Gases from the calcining zone 76 are also directed to a separator, designated 90, where dust is removed. The air plenums serving the submerged preheaters and submerged burners may be equipped with a drag to remove any dust that settles out there.

Line 82 designates a fuel supply from a fuel source 81 to the calcining zone 76. In the preferred embodiment, it has been found desirable to have fuel burners in the zone 76 only. However, as indicated by lines 84 and 86, fuel may be burned in zones 74 and 72. If this is done, the heat output of burners in zone 74 would be less than that of burners in zones 76 and the heat output of burners in zone 72 would be less than that of burners in zone 74.

The mix, when fully calcined, falls to a short rotary kiln 46 where clinkering takes place using a conventional firing scheme or a firing scheme like that shown in FIG. 5. From the rotary kiln, clinker passes to a conventional clinker cooler 80, such as a grate type cooler. About twenty percent (20 percent) of the total fuel input is used in the rotary kiln. Exhaust gases from the kiln 46 passes to the trough kiln and mixes with the exhaust of the calcining zone 76. A portion of the exhaust from the clinker cooler 80 is fed to the rotary kiln 46.

Figure 7:
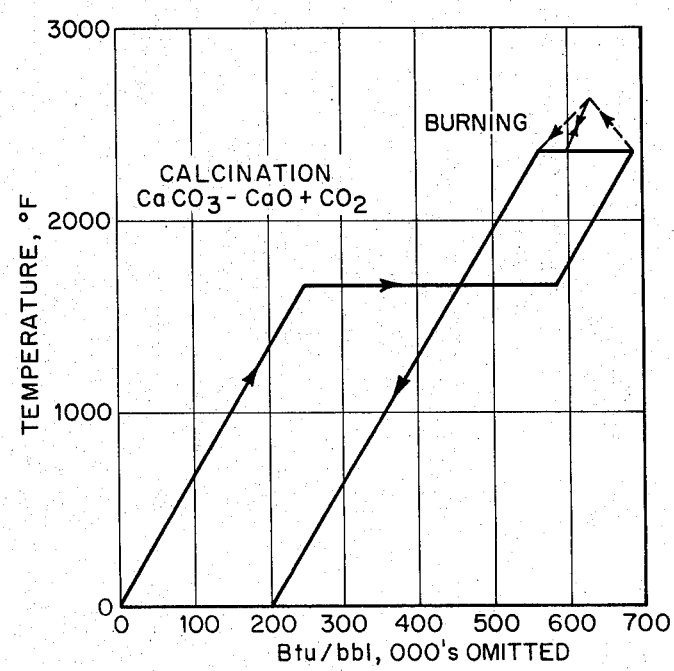
FIG. 7 is a plot of the heat-temperature relations existing in the processing of cement.

FIG. 7 illustrates heat-temperature relations obtained in heating and cooling a typical batch of cement mix. It will be noted that the reaction is endothermic during the calcination phase and that calcination occurs below 1,750°F which is desirable to avoid sintering CaO into large particles which result from calcination at excessive temperatures. Such large particles require lengthier periods in which subsequent burning reactions take place. If high temperatures are needed at or adjacent the end of the calcination zone, the temperature of combustion gases from burners at that area may be increased.

When a kiln constructed in accordance with this invention, effective heat transfer to finely divided material, such as cement mix, is greatly enhanced. This permits a reduction in kiln length with attendant savings in original equipment costs, space and radiation and convection losses. The present invention also provides constant contact between the surface of the particulate material and the combustion products or other hot gases in the zones where heating through small openings takes place. The system thus is characterized by low thermal inertia (i.e., quick response) when the firing rates of the submerged burners is changed. Also, since fuel is introduced into the system at thermally and mechanically independent locations, the process in one location can be independent of that in another. For example, the firing rates in the preheating and calcining zones are independently controllable and the clinker kiln speed can be independent of the rate of calcination. These features combined provide very fast start-up time as well as increased flexibility in process control.

In the trough kiln, structural components are stationary; therefore, additional reduced cost of equipment should be expected. Being stationary, the apparatus of this invention inherently leads itself to extremely good control of dusting because the chambers where dusting tends to occur may be sealed to reduce the escape of dust. Further, dusting may be reduced by use of an alternate perforation configuration 17; shown in FIG. 2, which has the large end of the cone directed toward the overburden of particulate material. Dusting is also reduced by recirculation of combustion products through the system, thereby permitting dust removal in a series of dust traps or separators. Accordingly, reduced cost of air pollution control equipment can be expected.

The present invention has been described with reference to preferred embodiments. It should be understood, however, that modifications may be made by those skilled in the art without departing from the scope of the invention.

We claim:

1. A kiln for finely divided particulate material comprising:
   a. an elongated, stationary, inclined trough having a perforated floor for supporting an overburden of finely divided particulate material;
   b. means for determining the angle of inclination of said inclined trough;
   c. burner means for forcing hot gases through the perforations in said floor and into substantially the entire overburden of finely divided particulate material supported thereon to produce heat exchange contact between the particles of such material and said gases; and
   d. means associated with said burner means for setting the firing rate thereof so the hot gases forced through said perforations partially fluidize substantially the entire overburden of finely divided particulate material supported on said floor to cause such material to flow down said inclined trough simultaneously with production of said heat exchange contact.

2. A kiln according to claim 1 wherein said burner means comprises at least one plenum chamber adjacent said perforated floor opposite the surface thereof for supporting said particulate material and wherein the openings formed in the surface of said floor by said perforations occupy a relatively small percent of the total floor area for establishing a uniform pressure in said plenum chamber, to thereby produce a pressure drop across said floor as said hot gases are forced therethrough which is substantially uniform over the entire portion of said floor surface adjacent said plenum chamber, whereby well defined stable jets of uniform size are directed into said overburden of material.

3. A kiln according to claim 2 wherein said burner means comprises a plurality of distinct modular units, each forming a distinct plenum chamber beneath said perforated floor, each of said modular unit being individually associated with said setting means and a distinct floor zone for enabling diverse hot gas flow rates to be established at distinct floor zones, the hot gas flow rate being uniform over any given floor zone.

4. A kiln according to claim 2 wherein the perforations in said floor have a width adapted to be substantially larger than the width of individual particles of said particulate material and a depth-to-width ratio adapted to be sufficient to prevent the passage of a substantial amount of said particulate material through said perforations regardless of whether hot gases are passing therethrough.

5. A cement kiln according to claim 1 wherein said finely divided material comprises cement mix, said kiln further comprising:
   a. first plenum means beneath the floor of an initial length of said trough; and
   b. means for forcing hot gases from said first plenum means through perforations in the floor of said initial length of said trough for preheating said cement mix and causing it to flow toward said subsequent length of said trough;
   c. said burner means forming a second plenum means beneath a subsequent length of said trough for forcing hot products of combustion through perforations in the floor of said subsequent length of said trough in cooperation with said setting means and calcining said cement mix and causing it to flow down said inclined trough, 6. A cement kiln according to claim 5 further comprising a rotary clinker kiln for receiving the calcined cement mix from said inclined trough.

7. A cement kiln according to claim 6 wherein hot gases from said rotary clinker kiln are fed to said inclined trough for heating said cement mix.

8. A cement kiln according to claim 6 further comprising a clinker cooler for receiving clinker from said clinker kiln.

9. A cement kiln according to claim 8 wherein hot gases from said clinker cooler are fed to said first plenum means for preheating said cement mix.

10. The kiln according to claim 1 wherein said determining means is variable between fixed positions for defining the slope of said trough.

11. A calcining kiln for cement manufacturing apparatus, said kiln comprising in combination:
   a. elongated trough means having an inlet, an outlet and intervening covering wall means;
   b. inclined trough floor means having perforations therethrough substantially normal to the plane thereof, for supporting an overburden of finely divided particulate material, said perforations covering substantially the entire floor area;
   c. means for determining the angle of inclination of said inclined trough;
   d. combustion chamber means contiguous substantially the entire surface of said inclined floor means opposite the surface thereof for supporting such material and in direct fluid communication with said perforations for producing substantially complete combustion therein of fuel and air; and
   e. means associated with said combustion chamber means for adjusting the rate of combustion in said combustion chamber and forcing jets of resulting combustion products through said perforations to partially fluidize such particulate material over substantially the entire floor area and cause such material to flow down said inclined floor from said inlet to said outlet and to simultaneously calcine such material.

12. A calcining kiln according to claim 11 wherein said determining means is variable between fixed positions for defining the slope of said trough.

13. A calcining kiln according to claim 12 wherein said combustion chamber means comprises a plurality of adjacent combustion chambers.

14. A kiln according to claim 13 wherein said adjusting means is individually associated with each of said combustion chambers to enable diverse hot gas flow rates to be established at distinct floor zones, the hot gas flow rate being uniform over any given floor zone.

15. The method of calcining material in a cement manufacturing process comprising the steps of:
   a. supporting a bed of such material over an inclined floor of a covered, stationary trough, said floor being perforated along substantially its entire length;
   b. combusting a fuel and air mixture beneath said floor along substantially the entire length thereof;
   c. controlling said combusting step to determine the quantity of combustion products produced;
   d. forcing products of combustion resulting from the controlled combustion through perforations in said floor under a preselected pressure head; and
   e. by means of said forcing step, partially fluidizing substantually the entire bed of such material along substantially the entire length of said inclined floor to cause flow thereof down said floor and simultaneously calcining such material.

* * * * *